United States Patent
Bossard

(10) Patent No.: US 9,039,814 B2
(45) Date of Patent: May 26, 2015

(54) SYSTEM AND METHOD FOR WELDING A PLURALITY OF SMALL DIAMETER PALLADIUM ALLOY TUBES TO A COMMON BASE PLATE IN A SPACE EFFICIENT MANNER

(71) Applicant: SAES PURE GAS, INC., San Luis Obispo, CA (US)

(72) Inventor: Peter R. Bossard, Perkasie, PA (US)

(73) Assignee: SAES PURE GAS, INC., San Luis Obispo, CA (US)

( * ) Notice: Subject to any disclaimer, the term of this patent is extended or adjusted under 35 U.S.C. 154(b) by 140 days.

(21) Appl. No.: 13/865,451

(22) Filed: Apr. 18, 2013

(65) Prior Publication Data

US 2014/0311344 A1 Oct. 23, 2014

(51) Int. Cl.
| | | |
|---|---|---|
| *B01D 53/22* | (2006.01) | |
| *B01D 71/02* | (2006.01) | |
| *B01D 69/04* | (2006.01) | |
| *B01D 63/06* | (2006.01) | |
| *B01D 65/00* | (2006.01) | |
| *F28F 9/18* | (2006.01) | |
| *F28F 21/08* | (2006.01) | |

(52) U.S. Cl.
CPC .............. *B01D 71/022* (2013.01); *B01D 69/04* (2013.01); *B01D 63/061* (2013.01); *B01D 65/003* (2013.01); *F28F 2275/067* (2013.01); *F28F 9/185* (2013.01); *F28F 21/082* (2013.01)

(58) Field of Classification Search
CPC .... B01D 53/22; B01D 71/022; B01D 63/061; B01D 69/04; B01D 65/003; F28F 9/185; F28F 21/082; F28F 2275/067

USPC .......... 96/4, 8, 10; 95/45, 55, 56; 210/321.88, 210/321.89

See application file for complete search history.

(56) References Cited

U.S. PATENT DOCUMENTS

| | | | |
|---|---|---|---|
| 3,052,452 A | | 9/1962 | Taga |
| 3,078,551 A | | 2/1963 | Patriarca et al. |
| 3,465,727 A | | 9/1969 | Tidball |
| 3,769,489 A | * | 10/1973 | Charlesworth .............. 219/60.2 |
| 4,125,280 A | | 11/1978 | Kuzel |
| 4,343,636 A | | 8/1982 | Bhatti |
| 4,481,399 A | * | 11/1984 | Greenfield ................... 219/60.2 |
| 4,488,342 A | * | 12/1984 | Daugirda ................. 29/890.043 |
| 4,735,638 A | * | 4/1988 | Ciliberti et al. ................. 55/523 |
| 4,798,928 A | * | 1/1989 | VanRhyn ..................... 219/60.2 |
| 4,943,001 A | * | 7/1990 | Meyer ........................ 228/173.4 |
| 5,401,406 A | * | 3/1995 | Johnson et al. ................. 55/523 |
| 5,407,004 A | | 4/1995 | DeRisi et al. |
| 5,997,463 A | | 12/1999 | Cutrer |
| 6,314,631 B1 | | 11/2001 | Pryor |
| 7,367,387 B2 | | 5/2008 | Brunner et al. |
| 7,883,670 B2 | | 2/2011 | Tonkovich et al. |
| 7,972,417 B2 | | 7/2011 | Bossard et al. |

(Continued)

*Primary Examiner* — Jason M Greene
(74) *Attorney, Agent, or Firm* — TIPS Group

(57) ABSTRACT

The tube assemblies are joined together into a matrix by a plate. The plate has a first surface, an opposite second surface and a plurality of holes. Each hole has a countersunk region that descends into the plate from the first surface. Tube assemblies are provided. Each tube assembly has a first end, an opposite second end, and a flare structure. The flare structure is sized to be fully received within the countersunk region. The tube assemblies extend through the holes in the plate. The flare structure of each tube assembly is welded to the plate within the countersunk region of each hole through which each tube assembly passes.

20 Claims, 7 Drawing Sheets

(56) References Cited

U.S. PATENT DOCUMENTS

| | | |
|---|---|---|
| 8,230,594 B1 * | 7/2012 | Bossard et al. .......... 29/890.043 |
| 2001/0023536 A1 | 9/2001 | Lambert et al. |
| 2002/0015654 A1 | 2/2002 | Das et al. |
| 2002/0088778 A1 | 7/2002 | Chang |
| 2002/0139781 A1 | 10/2002 | Milewski et al. |
| 2002/0162648 A1 | 11/2002 | Crook |
| 2004/0064946 A1 | 4/2004 | Smith et al. |
| 2005/0051314 A1 | 3/2005 | Heier |
| 2005/0178751 A1 | 8/2005 | Adelmann et al. |
| 2006/0011592 A1 | 1/2006 | Wang et al. |
| 2006/0081570 A1 | 4/2006 | Schildgen |
| 2006/0150388 A1 | 7/2006 | Inada et al. |
| 2006/0242831 A1 | 11/2006 | Cesaroni |
| 2007/0075054 A1 | 4/2007 | Nakamura |
| 2007/0114268 A1 | 5/2007 | Ishii et al. |
| 2007/0131401 A1 * | 6/2007 | Daly et al. .................... 165/158 |
| 2007/0278097 A1 | 12/2007 | Bhullar |
| 2008/0000625 A1 | 1/2008 | Baylis |
| 2008/0023453 A1 | 1/2008 | Zhang |
| 2008/0277105 A1 | 11/2008 | Geskes |
| 2009/0134235 A1 | 5/2009 | Ivri |
| 2009/0139703 A1 | 6/2009 | Vet et al. |
| 2009/0145888 A1 | 6/2009 | Hesse et al. |
| 2009/0280349 A1 | 11/2009 | Bittendorfer et al. |
| 2009/0308850 A1 | 12/2009 | Hill |
| 2010/0068132 A1 | 3/2010 | Vencill |
| 2010/0282722 A1 | 11/2010 | Ramsayer et al. |
| 2010/0289300 A1 | 11/2010 | Kokubo |
| 2010/0320177 A1 | 12/2010 | Ramsayer |
| 2011/0183152 A1 | 7/2011 | Lanham et al. |

* cited by examiner

SYSTEM AND METHOD FOR WELDING A PLURALITY OF SMALL DIAMETER PALLADIUM ALLOY TUBES TO A COMMON BASE PLATE IN A SPACE EFFICIENT MANNER

BACKGROUND OF THE INVENTION

1. Field of the Invention

In general, the present invention relates to methods and procedures used to manufacture a matrix of parallel tubes. More particularly, the present invention relates to methods and procedures where multiple parallel tubes are welded to a common base plate.

2. Prior Art Description

Matrices of parallel tubes are used in many different pieces of equipment. For instance, many heat exchangers use parallel tubes. One of the more unique uses of a matrix of parallel tubes can be found in hydrogen gas processing cells.

In hydrogen gas processing cells, such as hydrogen purifiers and hydrogen steam reformers, tubes of palladium alloy are exposed to gases that contain hydrogen. The palladium alloy is permeable to hydrogen at high temperatures. Accordingly, the hydrogen passes through the walls of the tubes and becomes separated from the other gases. An example of hydrogen processing equipment that utilizes a matrix of parallel tubes can be found in U.S. Pat. No. 7,972,417, entitled Hydrogen Gas Separator System Having Micro-Channel Construction For Efficiently Separating Hydrogen Gas From A Mixed Gas Source.

For many reasons, it is desirable to use very small diameter tubes in hydrogen gas processing cells. It is also desirable to place the tubes as close together as possible without touching. In order to hold the tubes firmly in the desired matrix orientation, the various tubes are typically set into a common metal base plate. In the prior art, holes are drilled into a base. The tubes are then placed into the holes and are brazed into place.

In certain hydrogen gas processing cell applications, hundreds of tubes are set into a single base. The tubes are packed very densely with only a fraction of a millimeter between adjacent tubes. Traditional welding techniques cannot be used because of the minute areas being welded and the lack of available space around each weld. Accordingly, heat brazing techniques are applied.

In a hydrogen gas processing cell, tubes of palladium alloy are brazed to stainless steel end caps. The palladium tubes are then tested for leaks and otherwise conditioned for commercial use. It is only after a palladium tube has been quality tested that it is added to a matrix of tubes. This ensures that the matrix of tubes will not contain any one defective tube that would render the whole matrix defective.

Once tested tubes are added to a matrix, the tested tubes traditionally undergo a second brazing procedure that connects the tubes to the matrix. During the second brazing procedure, the integrity of the pre-tested tubes may be compromised by thermal stresses. Furthermore, during the second brazing process, the initial brazed connections may become undone and create leaks. Additionally, when traditional brazing techniques are used on large matrices of tubes, it has proven difficult to create consistent brazed seals around all of the tubes. Often, some tubes have proper brazed seals, others do not.

Since hundreds of tubes may be present in a single matrix, even a brazing technique with 99.9% effectiveness will result in every hydrogen gas processing cell being defective because of at least one leaking brazed seal.

In U.S. Pat. No. 8,230,594, the Applicant patented a system that uses laser welding to weld tubes to a base plate. In this system, tubes are made with flares that rested on the base plate. The laser welder then welds the flares to the underlying base plate. Such a system is a vast improvement over prior art brazing techniques. However, some problems still occur. Mostly, the area required for the weld limits how densely the tubes can be packed into a matrix. Problems also occur in directing the laser about the dense matrix, since reflections from the laser light and the brightness caused by the weld tend to blind optical targeting systems.

A need therefore exists for an improved technique for joining hundreds of small diameter tubes in parallel to a common base in a very dense matrix. A need also exists for an improved technique of visualizing the welds as they are created. These needs are met by the present invention as described and claimed below.

SUMMARY OF THE INVENTION

The present invention is a tube matrix and the tube assemblies that combine to make the tube matrix. The tube assemblies are joined together into a matrix by a plate. The plate has a first surface, an opposite second surface, and a plurality of holes that extend from the first surface to the second surface. Each hole has a countersunk region that descends into the plate from the first surface.

A plurality of tube assemblies are provided. Each tube assembly has a first end, an opposite second end, and a flare structure proximate the first end. The flare structure is sized to be fully received within the countersunk region. The tube assemblies extend through the holes in the plate. The flare structure of each tube assembly is welded to the plate within the countersunk region of each hole through which each tube assembly passes.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
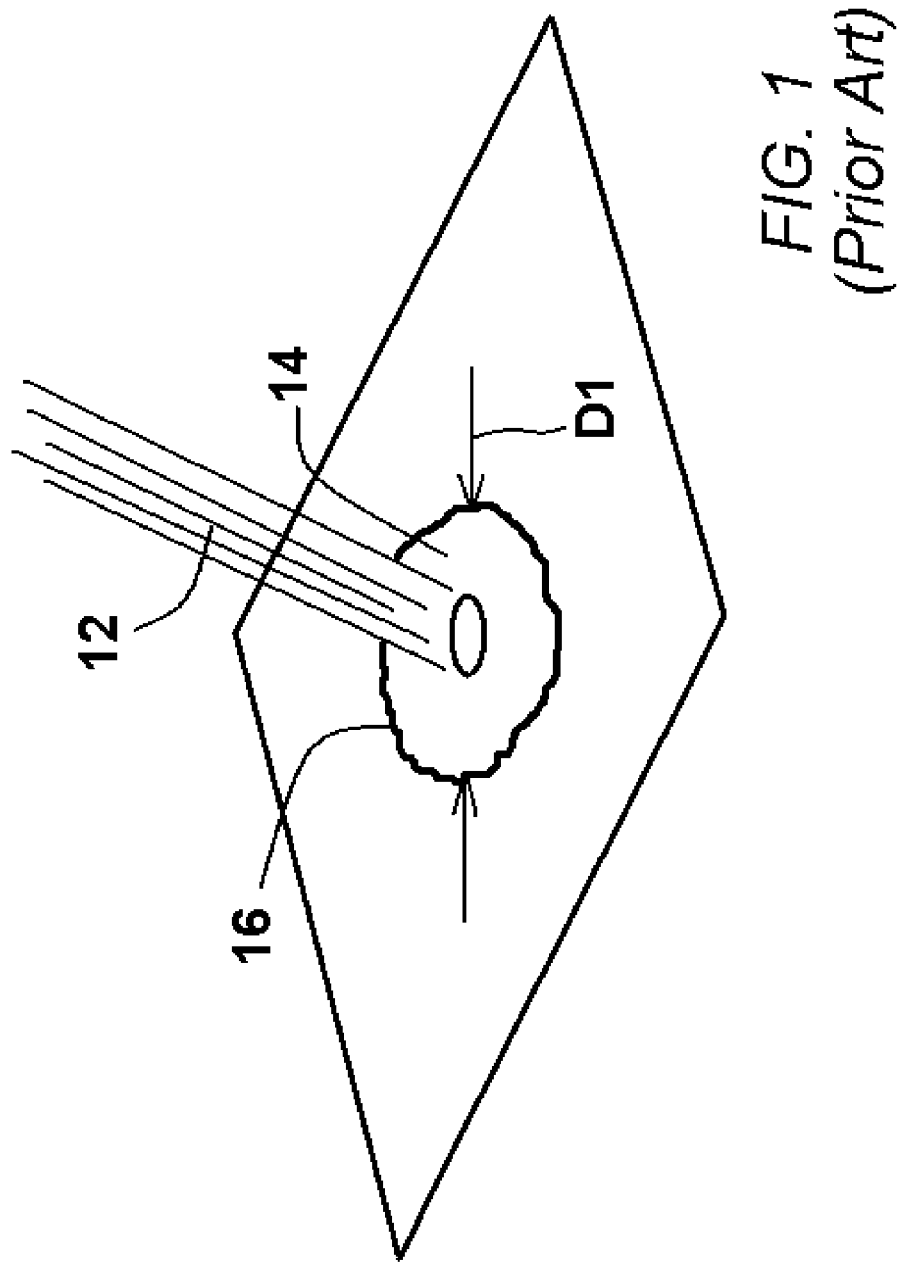
FIG. 1 is a prior art image of a laser beam weld showing a surface diffusion zone.
Figure 2:
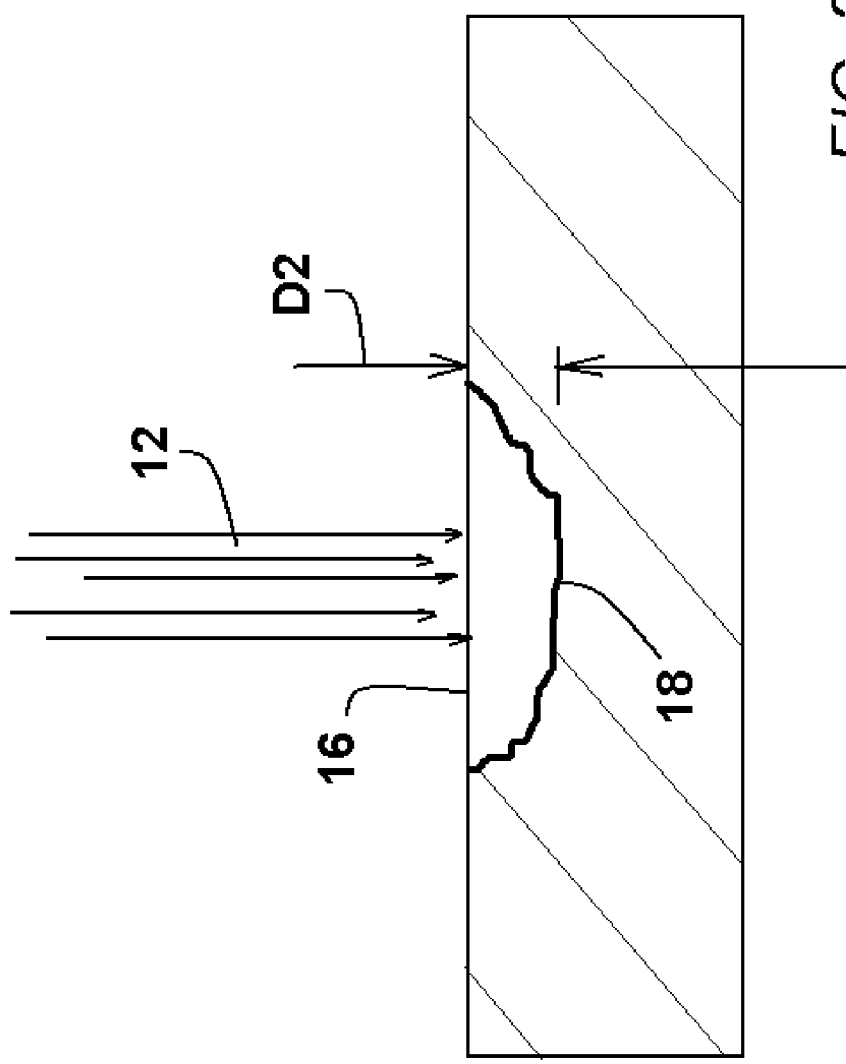
FIG. 2 is a cross-sectional prior art image of a laser beam weld showing a subsurface diffusion zone.

Referring to both FIG. 1 and FIG. 2, it will be understood that when a laser beam 12 is used to create a weld 14, that weld 14 has a surface fusion zone 16 of a first diameter D1. The weld 14 also has a subsurface fusion zone 18 of a maximum depth D2.

Within the fusion zones 16, 18, the metal being welded melts and fuses together to create the desired weld. The diameter D1 of the surface fusion zone 16 is typically significantly wider than the diameter of the laser beam 12. Both the diameter D1 and the depth D2 of the fusion zones 16, 18 are affected by the strength of the laser, the duration of the laser's pulse and the materials being welding.

It will therefore be understood that as objects are being laser welded into a dense pattern, the primary factors in determining the density are the dimensions of the fusion zones 16, 18 created by the welds. The smaller the fusion zones that are made, the denser the welds that can be made.

The system and methodology of the present invention can be used to weld a denser matrix of tubes than has previously been possible. The tubes in the matrix can be made of many different materials, such as stainless steel, palladium alloys and the like. The tube material selected depends upon the intended use of the tube matrix. The present invention is especially useful in making a matrix of tubes for use in a hydrogen gas processor. Some models of hydrogen processor cells use both a matrix of stainless steel tubes and a matrix of palladium alloy tubes. As such, the present application presents two exemplary embodiments that show tubes of palladium alloy and tubes of stainless steel being welded into matrices. Such embodiments present the best modes contemplated for the invention. However, the examples are merely exemplary and should not be considered limitations to the scope of the claims.

Figure 3:
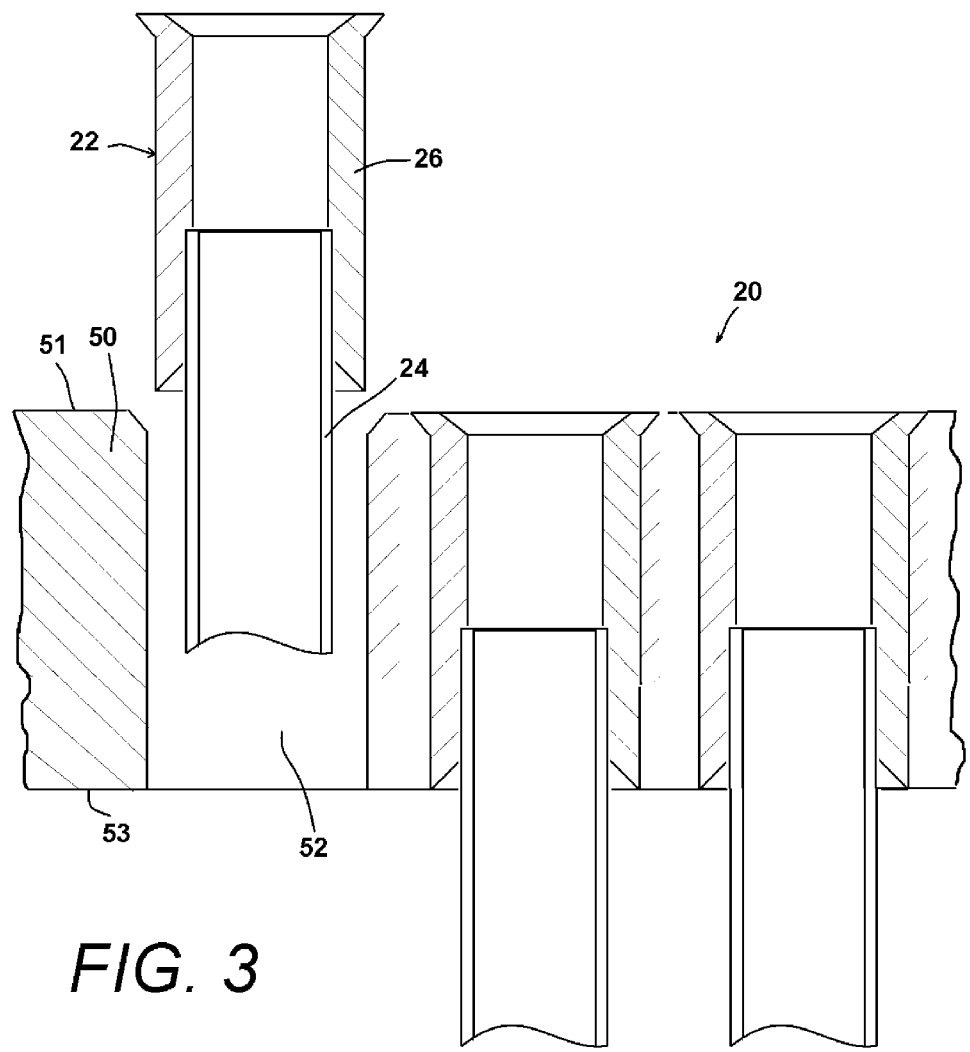
FIG. 3 is a fragmented cross-sectional view of a segment of a tube matrix.

Referring to FIG. 3, a segment of a tube matrix 20 is shown. The tube matrix 20 contains a plurality of tube assemblies 22. Each tube assembly 22 contains a tube 24 of palladium alloy. A welding termination 26 is connected to one end of the palladium alloy tube 24. The welding termination 26 is a short tubular element that slips over one end of the palladium alloy tube 24.

Figure 4:
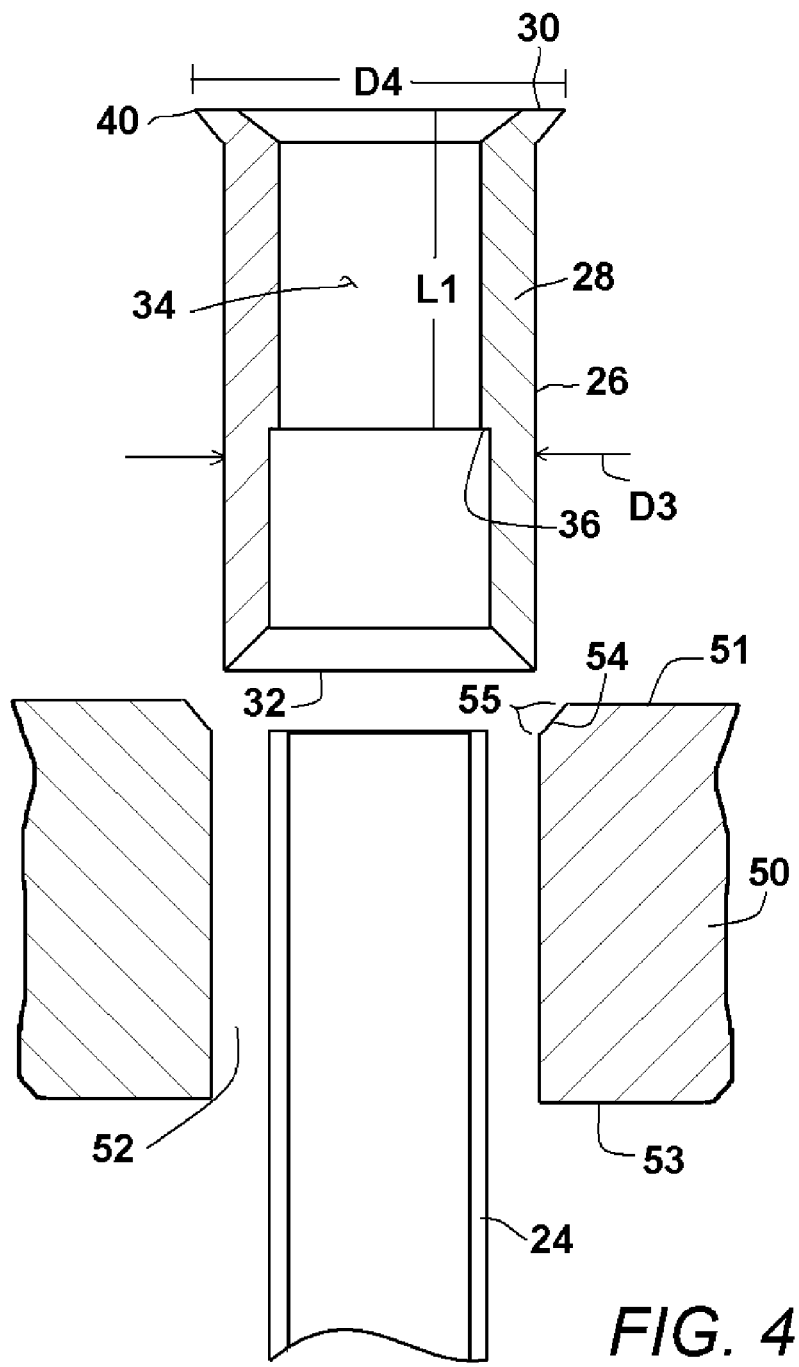
FIG. 4 is an exploded view of a tube assembly having a welding termination.
Figure 5:
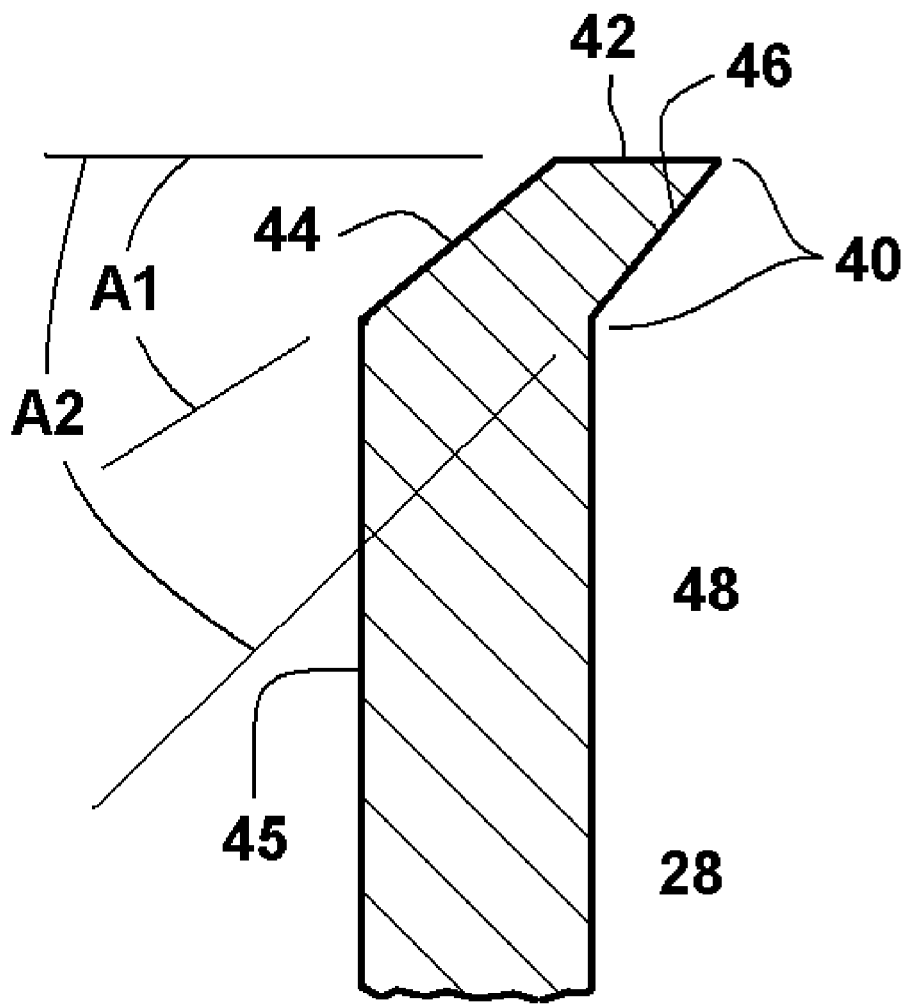
FIG. 5 is an enlarged cross-sectional view of the flare structure on a welding termination.

Referring to FIG. 4 and FIG. 5 in conjunction with FIG. 3, it can be seen that the welding termination 26 has a cylindrical body 28 with a top end 30 and a bottom end 32. The welding termination 26 is preferably made of the same material as is the base plate to which it will eventually be welded. Both the top end 30 and the bottom end 32 of the cylindrical body 28 are open, therein defining the opposite ends of an open central conduit 34. A ridge 36 is formed in the open central conduit 34, wherein the inside diameter of the open central conduit 34 abruptly changes from a first inside diameter to a larger second inside diameter. The ridge 36 is disposed a length L1 from the top end 30 of the welding termination 26.

The top end 30 of the welding termination 26 has a complex flare structure 40. Most of the welding terminations 26 have a common outside diameter D3. In the flare structure 40, the outside diameter increases between 5% and 20% to a second larger outside diameter D4. The top of the flare structure 40 has a flat surface 42. The flare structure 40 has an inside beveled surface 44 that extends from the flat surface 42 to the inside wall 45 that defines the open central conduit 34. The inside beveled surface 44 is beveled at an acute angle A1, which is preferably between 20 degrees and 45 degrees below the horizontal.

The flare structure 40 also has an outside beveled surface 46 that extends from the flat surface 42 to the outside wall 48 of the cylindrical body 28. The outside beveled surface 46 is beveled at an acute angle A2 which is preferably between 40 degrees and 75 degrees.

The palladium alloy tube 24 is inserted into the open bottom end 32 of the welding termination 26 until the palladium alloy tube 24 seats against the ridge 36. The palladium alloy tube 24 is brazed in place in a separate procedure. After the welding termination 26 is brazed to the palladium ally tube 24 to form the tube assembly 22, the tube assembly 22 is quality tested. If a tube assembly 22 passes quality testing, it is known that the braze between the weld termination 26 and the palladium alloy tube 24 is proper. It is further known that the palladium alloy tube 24 itself is not cracked, ruptured or otherwise defective.

In FIGS. 3 and 4, a segment of a base plate 50 is shown. The base plate 50 is metal and is preferably a stainless steel alloy. However, other non-reactive alloys such as Hastelloy® can also be used. It is preferred that the base plate 50 and the welding termination 26 be the same alloys or compatible alloys to promote ease of welding and to reduce stresses that may be caused by using alloys with different expansion coefficients. The base plate 50 has a first surface 51 and an opposite second surface 53. Holes 52 are machined through the base plate 50 from the first surface 51 to the second surface 52 in a dense matrix pattern. Each hole 52 has a primary inside diameter which is only slightly larger than the primary outside diameter D3 of the tube assemblies 22. Accordingly, the tube assemblies 22 can pass into the holes 52 and have little lateral play once in the holes 52. The diameter of the holes 52 is smaller than the diameter D4 of the flare structures 40 on the tube assemblies 22. Accordingly, the flare structures 40 prevent the tube assemblies 22 from passing completely through the holes 52.

Each hole 52 has a countersunk region 55 that extends into the base plate 50 from its first surface 51. The countersunk region 55 is sized to receive the flare structure 40 of the welding termination 26. In the shown embodiment, the countersunk region 55 is defined by a beveled surface 54 that funnels toward the hole 52 from the first surface 51. The angle of the beveled surface 54 matches the outside beveled surface 46 of the flare structure 40 of the welding termination 26. Furthermore, the depth of the countersunk region 55 is generally equal to the height of the flare structure 40. Consequently, the flare structure 40 on the welding termination 26 seats flush against the beveled surface 54 of the corresponding hole 52 with none of the flare structure 40 extending above the hole 52.

Figure 6:
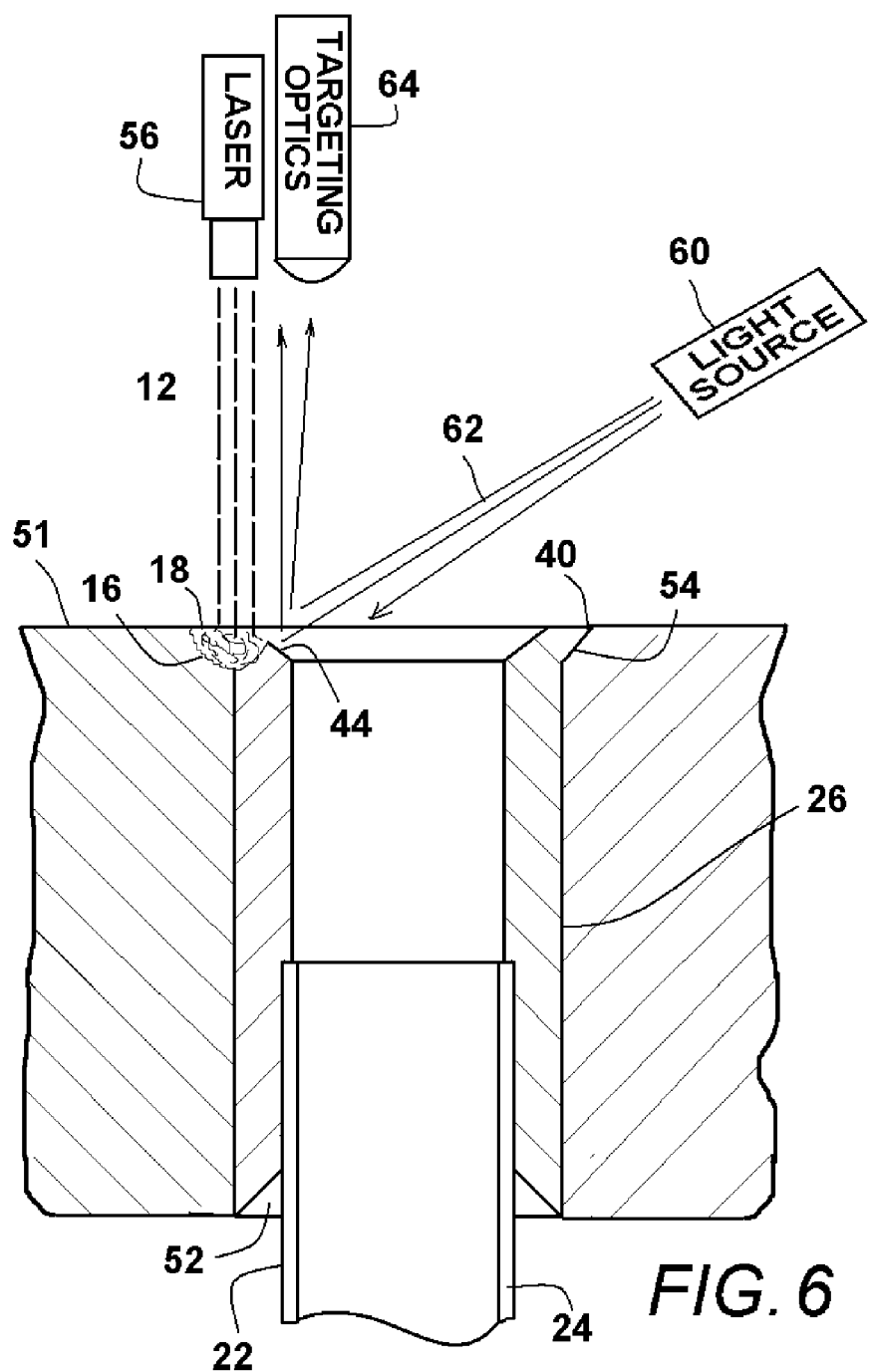
FIG. 6 is a schematic showing a segment of a tube matrix in a laser welding machine.

Referring now to FIG. 6, the flare structure 40 of a welding termination 26 is shown seated against the beveled surface 54 of a base plate hole 52. This causes a surface-to-surface abutment between the outside beveled surface 46 of the flare structure 40 and the full length of the beveled surface 54 at the top of the hole 52.

In FIG. 6, the surface-to-surface abutment is also shown being welded by the laser beam 12 of a laser welder 56. The laser beam 12 is powered to create a subsurface fusion zone 16 that penetrates at least as deep as the bottom of the beveled surface 46. However, the beveled surface 46 is deepest near the center and shallow near its periphery. Consequently, very little energy is needed to create the desired weld near the periphery. The surface-to-surface contact along the length of the beveled surface 54 is welded together in the subsurface fusion zone 16. The subsurface fusion zone 16 can be shifted inwardly way from the periphery. This creates very little overflow and the diameter of the weld zone is not much larger than the flare structure 40 being welded. Furthermore, it will be understood that since none of the mass of the welding termination 26 extends above the top of the base plate 50, the laser welding does not create any molten flow that would flow downhill and spread across the top surface 51 of the base plate 50. The result is a surface fusion zone 18 with a diameter that is only slightly larger than the diameter of the flare structure 40.

The fusion zones 16, 18 created by the laser beam 12 are created in a highly efficient manner. Accordingly, the braze that joins the weld termination 26 to the palladium alloy tubes 24 experience only a minimal amount of heat and stress from the welding. As a consequence, palladium alloy tube assemblies 22 that have been quality tested as good can be consistently maintained in that condition throughout the laser welding process.

It will therefore be understood that the beveled surface 54 atop the hole 52 of the base plate 50 and the flare structure 40 on the welding termination 26 serve three important functions. First, these features combine to set the welding termination 26 at the right depth into the base plate 50. Second, these features create a long area of surface-to-surface contact that are joined by welding. This results in a particularly strong and high quality weld. Third, since no material being welded is above the top surface of the base plate 50, the fusion zones created by the weld are small and only slightly larger than the diameter of the beveled surface 54 on the base plate 50. Consequently, tube assemblies 22 can be welded through holes 52 in a common base plate 50 in a highly dense pattern.

Yet another benefit can be obtained by using the welding termination and beveled hole of the present invention. Referring again to FIG. 6, it will be understood that in certain laser welding systems, the laser welder 56 is controlled using optical targeting software. Such systems have a difficult time maintaining imaging when a bright metal, such as stainless steel is being welded. This is because a lot of the energy of the laser beam and illumination lights are reflected back toward the targeting system by the reflectivity of the metal.

The welding termination 26 is made with an inside beveled surface 44. The inside beveled surface 44 is at an acute angle with respect to the horizontal. A light source 60 is positioned to the side of the laser welding unit. The light source 60 creates beams of light 62 at an angle that is complimentary to the angle of the inside beveled surface 44. The result is that the inside beveled surface 44 reflects the light vertically upward toward an optical targeting system 64. The optical targeting system 64 can therefore maintain better targeting control during the laser welding process.

Figure 7:
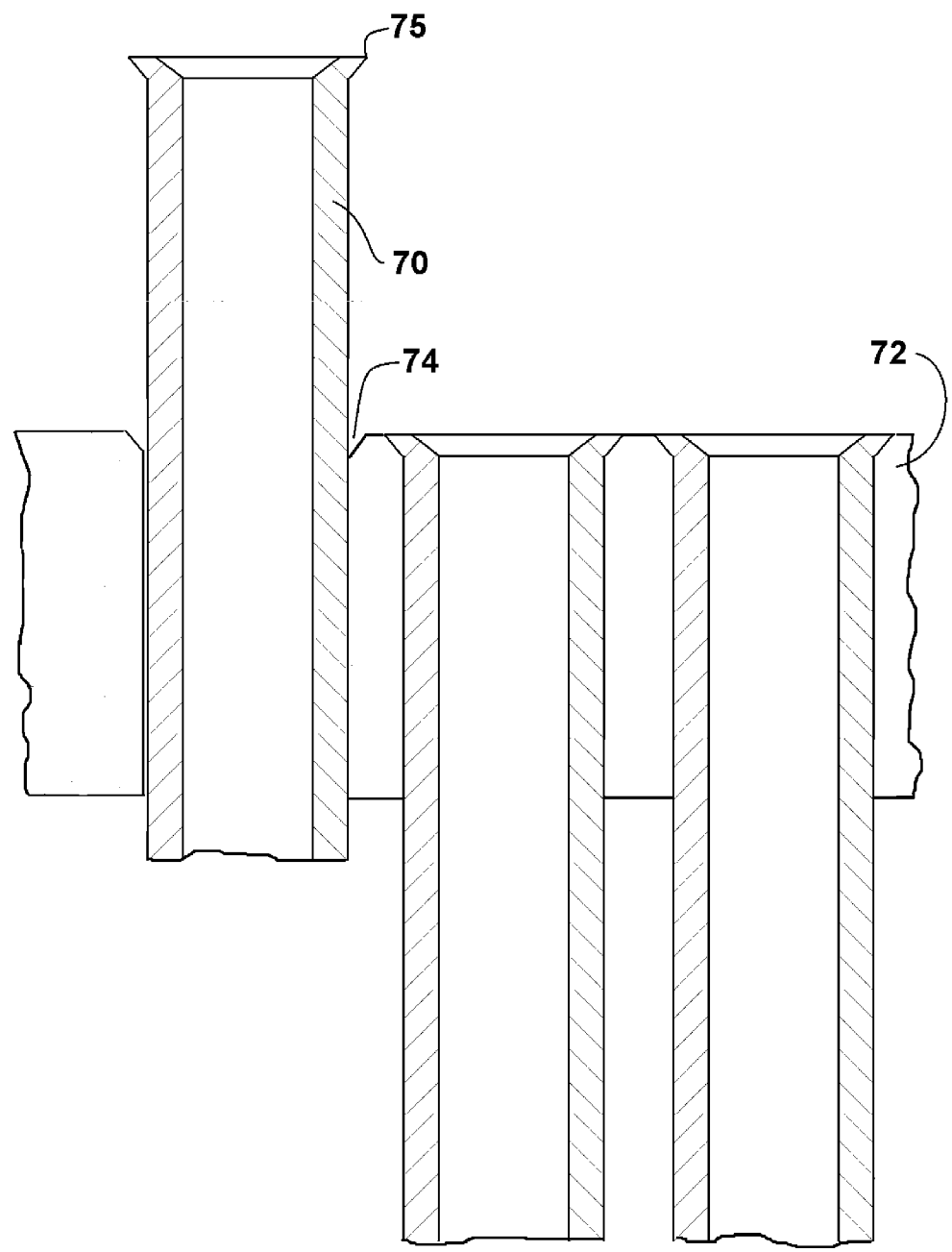
FIG. 7 is a cross-sectional view of a segment of an alternate embodiment of a tube matrix.

As has been previously mentioned, hydrogen gas processors also contain tube matrices that are made with stainless steel tubes. Referring to FIG. 7, a segment of a matrix is shown where tubes 70 of stainless steel or Hastelloy® are welded directly to a base plate 72. In this embodiment, flare structure dimensions that have been previously shown as part of the welding termination can be machined directly onto the end of each tube 70. The base plate 72 has the same beveled holes 74 as have been previously described. The tubes 70 pass into the holes 74, wherein each flare structure 75 seats into the beveled hole 74 in the manner previously described. The flares structures 75 are then laser welded to the base plate 72 in the same manner as has been previously described.

It will be understood that the embodiments of the present invention that are illustrated and described are merely exemplary and that a person skilled in the art can make many variations to those embodiments. For example, any desired distance can be made between tubes, other than the maximum density embodiment shown. Furthermore, the diameter of the tubes and of the flare structures can be varied within functional limitations. Likewise, tubes and flare structures with shapes other than round can be used. For example a square tube with a square flare can be used. All such variations, modifications and alternate embodiments are intended to be included within the scope of the present invention as defined by the claims.

What is claimed is:

1. A tube matrix, comprising:
 a metal plate having a first surface, and an opposite second surface and a plurality of holes that extend from said first surface to said second surface, wherein each hole from said plurality of holes has a first beveled surface with a first angle and a first depth that funnels into said hole from said first surface;
 a plurality of hydrogen permeable metal tube elements, wherein each tube element from said plurality of hydrogen permeable tube elements has a first end, an opposite second end and a flare structure proximate said first end, wherein said flare structure has a second beveled surface with a second angle and a second depth that matches the first angle and the first depth of the first beveled surface, whereby the flare structure seats flush against the first beveled surface with none of the flare structure extending above the hole;
 wherein said plurality of hydrogen permeable metal tube elements extend through said plurality of holes in said plate, and wherein said second beveled surface of each said tube element is welded to said first beveled surface of each said hole through which each said tube element passes;
 wherein each said tube element in said plurality of hydrogen permeable tube elements is an assembly comprising a palladium alloy tube and a welding termination attached to said palladium alloy tube, wherein said flare structure is part of said welding termination; and
 wherein said plate and said welding termination are made from the same metal alloy.

2. The tube matrix according to claim 1, wherein said metal alloy comprises stainless steel.

3. The tube matrix according to claim 1, wherein said metal alloy comprises a non-reactive metal alloy.

4. The tube matrix according to claim 1, wherein each of said plurality of holes has a primary inside diameter which is slightly larger than a primary outside diameter of the metal tube elements, whereby the tube assemblies have little lateral play once in the holes.

5. The tube matrix according to claim 1, wherein each said flare structure has a flat top surface with an internal edge and an external edge, wherein said second beveled surface begins at said external edge of said flat top surface.

6. The tube matrix according to claim 5, further including a third beveled surface that begins at said internal edge of said flare structure and funnels inwardly.

7. A tube matrix, comprising:
 a plate made from a non-reactive metal alloy and having a first surface, an opposite second surface, and a plurality of holes that extend from said first surface to said second surface,
 wherein each hole of said plurality of holes has a countersunk region that descends into said plate from said first surface; and
 a plurality of hydrogen permeable tube elements, wherein each tube element from said plurality of hydrogen permeable tube elements has a first end, an opposite second end, and a flare structure proximate said first end, wherein said flare structure is sized to be fully received within said countersunk region such that none of the flare structure extends above the hole;
 wherein said plurality of hydrogen permeable tube elements extends through said plurality of holes in said plate, and wherein said flare structure of each said tube element is welded to said plate within said countersunk region of each said hole through which each said tube element passes;
 wherein said plurality of hydrogen permeable tube elements has a welding termination made from the same non-reactive metal alloy as the plate and each flare structure is formed directly onto said welding termination; and wherein said plurality of hydrogen permeable tube elements are tube assemblies that include palladium alloy tubes and welding terminations that cap said palladium alloy tubes, wherein each of said flare structures is formed on said welding terminations.

8. The matrix according to claim 7, wherein said non-reactive metal alloy comprises stainless steel.

9. The matrix according to claim 7, wherein said non-reactive metal alloy comprises a Hastelloy alloy.

10. The matrix according to claim 7, wherein each said countersunk region presents a first beveled surface that funnels toward said hole.

11. The matrix according to claim 10, wherein said flare structure presents a second beveled surface that abuts against said first beveled surface within each said countersunk region.

12. The matrix according to claim 11, wherein said first beveled surface and said second beveled surface are welded together in said countersunk region.

13. A tube assembly for use in a metal tube matrix system, said tube assembly comprising:
a palladium alloy tube having a first end and a second end;
a welding termination made from a non-reactive metal alloy including a short, tubular bottom end that slips over said first end of said palladium alloy tube, and a top end including a flare structure with a flat top, an exterior surface that is beveled at a first acute angle, and an interior surface that is beveled at a second acute angle, wherein the interior surface is a bright metal surface capable of reflecting a beam of light.

14. The assembly according to claim 13, wherein said welding termination comprises stainless steel.

15. The assembly according to claim 14, wherein said welding termination has a constant outside diameter between said bottom end and said flare structure, wherein said flare structure has a second diameter that is larger than said outside diameter.

16. The assembly according to claim 13, wherein said welding termination defines an open interior conduit, that communicates with said palladium alloy tube.

17. The assembly according to claim 16, wherein said welding termination is affixed to said palladium alloy tube with a brazed connection.

18. The assembly according to claim 17, wherein said flare structure also has an interior beveled surface that funnels into said open interior conduit at an acute angle.

19. The assembly according to claim 18, wherein the interior beveled surface is a bright metal surface.

20. The assembly according to claim 19, wherein the interior beveled surface is capable of reflecting a beam of light.

* * * * *